US012581462B2

(12) United States Patent
Liu

(10) Patent No.: US 12,581,462 B2
(45) Date of Patent: Mar. 17, 2026

(54) RESOURCE CONFIGURATION METHOD AND APPARATUS, COMMUNICATION DEVICE AND STORAGE MEDIUM

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 379 days.

(21) Appl. No.: 18/044,904

(22) PCT Filed: Sep. 14, 2020

(86) PCT No.: PCT/CN2020/115140
§ 371 (c)(1),
(2) Date: Mar. 10, 2023

(87) PCT Pub. No.: WO2022/052122
PCT Pub. Date: Mar. 17, 2022

(65) Prior Publication Data
US 2023/0371007 A1 Nov. 16, 2023

(51) Int. Cl.
*H04W 72/04* (2023.01)
*H04L 27/06* (2006.01)
*H04L 27/26* (2006.01)

(52) U.S. Cl.
CPC ......... *H04W 72/04* (2013.01); *H04L 27/2614* (2013.01)

(58) Field of Classification Search
CPC . H04L 27/2614; H04L 5/0066; H04L 5/0044; H04W 72/51; H04W 72/04; H04W 72/23; Y02D 30/70
See application file for complete search history.

(56) References Cited

U.S. PATENT DOCUMENTS

| | | | |
|---|---|---|---|
| 10,966,283 B2 * | 3/2021 | Xiong | H04L 5/0051 |
| 2010/0142455 A1 * | 6/2010 | Imamura | H04W 52/367 |
| | | | 370/329 |
| 2015/0078279 A1 | 3/2015 | Ko et al. | |
| 2016/0269211 A1 * | 9/2016 | Tao | H04L 27/2623 |

(Continued)

FOREIGN PATENT DOCUMENTS

CN 110447193 A 11/2019

OTHER PUBLICATIONS

Huawei, "sPUSCH design", 3GPP TSG RAN WG1 Meeting #90 R1-1712083, Aug. 25, 2017, Sections 1-4, Type-A.

(Continued)

*Primary Examiner* — Brian D Nguyen
(74) *Attorney, Agent, or Firm* — Volpe Koenig

(57) ABSTRACT

A resource configuration method, apparatus, a communication device and a storage medium that improve the resource utilization in a wireless network. The resource utilization of the wireless network is improved by configuring a resource set of a physical uplink shared channel (PUSCH), the resource set comprises at least one Type0 PUSCH resource, and a difference between a maximum value of a peak-to-average power ratio (PAPR) corresponding to each Type0 PUSCH resource and a minimum value of the PAPR in the configured resource set does not exceed a first difference range.

19 Claims, 6 Drawing Sheets

---

UE

Base station

201: Configure a resource set of a physical uplink shared channel (PUSCH), where the resource set includes at least one Type0 PUSCH resource, and a difference between a maximum value of a peak-to-average power ratio (PAPR) corresponding to each Type0 PUSCH resource and a minimum value of the PAPR in the resource set does not exceed a first difference range 202: Determine the Type0 PUSCH resource allocated to UE from the resource set

(56) References Cited

U.S. PATENT DOCUMENTS

| | | | |
|---|---|---|---|
| 2017/0019942 A1 | 1/2017 | Ko et al. | |
| 2020/0028725 A1* | 1/2020 | Limberg | H04L 25/067 |
| 2020/0137745 A1* | 4/2020 | Bachu | H04W 72/0453 |
| 2020/0260526 A1* | 8/2020 | Xiong | H04W 80/08 |
| 2020/0343954 A1* | 10/2020 | Takeda | H04W 72/21 |
| 2022/0150937 A1* | 5/2022 | Kim | H04W 52/52 |
| 2022/0386351 A1* | 12/2022 | Yoshimura | H04L 5/0044 |

OTHER PUBLICATIONS

3GPP, "3GPP TS 38.214 V15.8.0", Dec. 2019, entire document, Type-A.

* cited by examiner

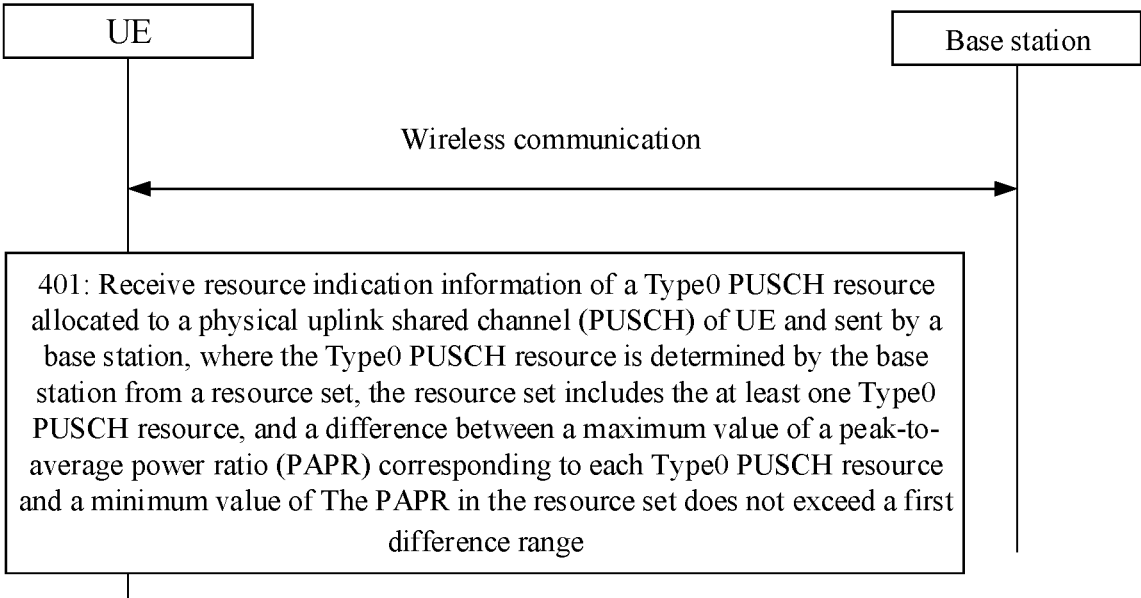

401: Receive resource indication information of a Type0 PUSCH resource allocated to a physical uplink shared channel (PUSCH) of UE and sent by a base station, where the Type0 PUSCH resource is determined by the base station from a resource set, the resource set includes the at least one Type0 PUSCH resource, and a difference between a maximum value of a peak-to-average power ratio (PAPR) corresponding to each Type0 PUSCH resource and a minimum value of The PAPR in the resource set does not exceed a first difference range

Fig. 4

RESOURCE CONFIGURATION METHOD AND APPARATUS, COMMUNICATION DEVICE AND STORAGE MEDIUM

CROSS REFERENCE TO RELATED APPLICATION

The present application is a U.S. National Stage of International Application No. PCT/CN2020/115140, filed on Sep. 14, 2020, the contents of all of which are incorporated herein by reference in its entirety for all purposes.

BACKGROUND

In a cellular mobile communication standard of 3GPP R15/16 version, a base station indicates a type0 physical uplink shared channel (PUSCH) resource based on a bitmap. Each bit of the bitmap indicates a resource block group (RBG) consisting of a plurality of resource blocks (RBs), thus improving an indicated efficiency of a type0 PUSCH resource.

SUMMARY

According to a first aspect of an example of the disclosure, a resource configuration method is provided and performed by a base station. The method includes:

configuring a resource set of a physical uplink shared channel (PUSCH), where the resource set includes at least one Type0 PUSCH resource, and a difference between a maximum value of a peak-to-average power ratio (PAPR) corresponding to each Type0 PUSCH resource and a minimum value of the PAPR in the configured resource set does not exceed a first difference range.

According to a second aspect of an example of the disclosure, a resource configuration method is provided and performed by a user equipment (UE). The method includes:

receiving resource indication information of a Type0 PUSCH resource allocated to a physical uplink shared channel (PUSCH) of the UE and sent by a base station, where the Type0 PUSCH resource is determined by the base station from a resource set, the resource set includes the at least one Type0 PUSCH resource, and a difference between a maximum value of a peak-to-average power ratio (PAPR) corresponding to each Type0 PUSCH resource and a minimum value of the PAPR in the resource set does not exceed a first difference range.

According to a third aspect of an example of the disclosure, a communication device is provided, including a processor, a memory, and an executable program stored on the memory and capable of being run by the processor, where the processor, when running the executable program, executes steps of the resource configuration method as described in the first aspect or the second aspect.

According to a fourth aspect of an example of the disclosure, a non-transitory storage medium is provided, storing an executable program, where the executable program, when being executed by a processor, implements steps of the resource configuration method as described in the first aspect or the second aspect.

BRIEF DESCRIPTION OF THE DRAWINGS

The accompanying drawings here, which are incorporated in and constitute a part of this specification, illustrate examples consistent with the disclosure and together with the specification, serve to explain the principles of the examples of the disclosure.

FIG. 4 is a schematic flow diagram of yet another resource configuration method shown according to an example.

DETAILED DESCRIPTION

Examples will be illustrated in detail here, and instances of which are represented in accompanying drawings. When the following description refers to the accompanying drawings, the same number in the different accompanying drawings represents the same or similar elements unless otherwise indicated. The implementations described in the following examples do not represent all implementations consistent with examples of the disclosure. On the contrary, they are merely examples of an apparatus and a method consistent with some aspects of the examples of the disclosure as detailed in the appended claims.

Terms used in the examples of the disclosure are merely for the purpose of describing the particular examples and are not intended to limit the examples of the disclosure. The singular forms "a," "the," and "this" used in the examples of the disclosure and the appended claims are intended to include the plural forms as well, unless the context clearly indicates other meanings. It should be further understood that the term "and/or" used here refers to and includes any or all possible combinations of one or more associated listed items.

It should be understood that terms "first," "second," "third," and the like may be employed in the examples of the disclosure to describe various information, but the information should not be limited to these terms. These terms are merely used to distinguish the same type of information from one another. For example, in a case of not departing from the scope of the examples of the disclosure, first information may also be called second information, and similarly, the second information may also be called the first information. Depending on the context, the word "if" as used here may be interpreted as "at the time of," "when," or "in response to determining".

The disclosure relates to the technical field of wireless communication, but is not limited to the technical field of wireless communication, in particular to a resource configuration method and apparatus, a communication device, and a storage medium.

Figure 1:
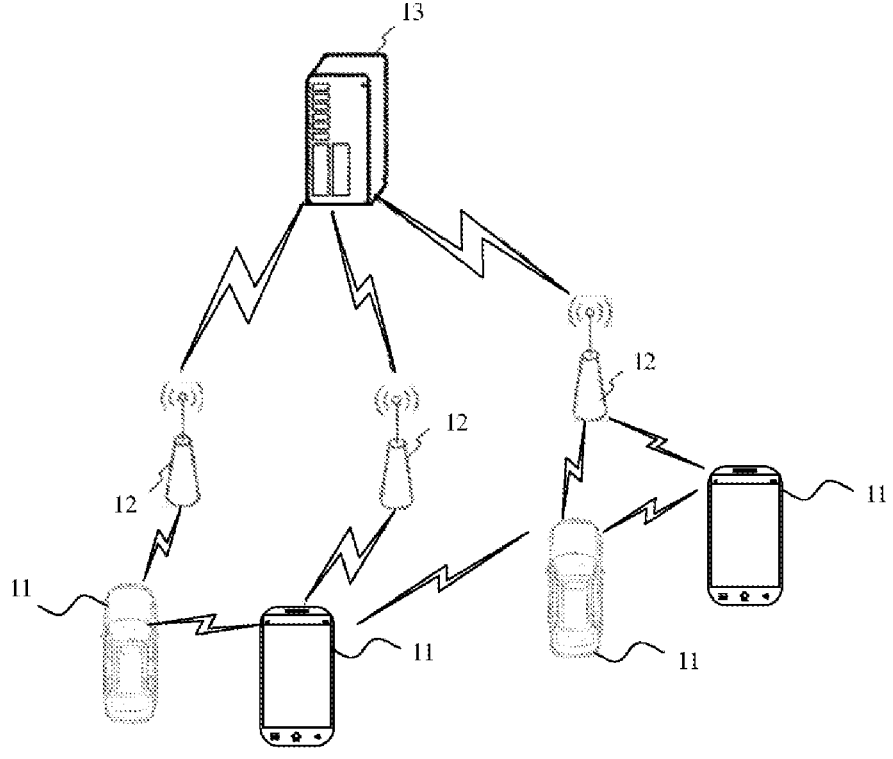
FIG. 1 is a schematic structural diagram of a wireless communication system shown according to an example.

FIG. 1 shows a schematic structural diagram of a wireless communication system provided by an example of the disclosure. As shown in FIG. 1, the wireless communication system is a communication system based on a cellular mobile communication technology, and the wireless communication system may include: a plurality of terminals 11 and a plurality of base stations 12.

The terminal 11 may refer to a device that provides voice and/or data connectivity to a user. The terminal 11 may communicate with one or more core networks via a radio access network (RAN), and the terminal 11 may be an Internet of Things terminal, such as a sensor device, a mobile phone (or called a "cellular" phone), and a computer with the Internet of Things terminal. For example, the terminal may be fixed, portable, pocket-sized, hand-held, computer-built or vehicle-mounted apparatuses, such as a station (STA), a subscriber unit, a subscriber station, a mobile station, a mobile, a remote station, an access point, a remote terminal, an access terminal, a user apparatus (user terminal), a user agent, a user device, or a user terminal (user equipment, UE). Alternatively, the terminal 11 may also be a device of an unmanned aerial vehicle. Alternatively, the terminal 11 may also be a vehicle-mounted device, for example, a trip computer with a wireless communication function, or a wireless communication device externally connected to the trip computer. Alternatively, the terminal 11 may also be a roadside device, for example, may be a streetlight, a signal light, or other roadside devices with the wireless communication function.

The base station 12 may be a network-side device in the wireless communication system. The wireless communication system may be a 4th generation mobile communication (4G) system, also known as a long-term evolution (LTE) system; alternatively, the wireless communication system may also be a 5G system, also known as a new radio (NR) system or a 5G NR system. Alternatively, the wireless communication system may also be a next-generation system of the 5G system. An access network in the 5G system may be called a new generation radio access network (NG-RAN), or an MTC system.

The base station 12 may be an evolved base station (eNB) employed in the 4G system. Alternatively, the base station 12 may also be a base station (gNB) that employs a centralized distributed architecture in the 5G system. In response to determining that the base station 12 employs the centralized distributed architecture, the base station usually includes a central unit (CU) and at least two distributed units (DU). The central unit is internally provided with protocol stacks of a packet data convergence protocol (PDCP) layer, a radio link control (RLC) protocol layer, and a media access control (MAC) layer, and the distributed unit is internally provided with a physical (PHY) layer protocol stack. The specific implementation of the base station 12 is not limited in the examples of the disclosure.

A wireless connection may be established between the base station 12 and the terminal 11 through a wireless air interface. In different implementations, the wireless air interface is a wireless air interface based on the 4th generation mobile communication network technology (4G) standard; alternatively, the wireless air interface is a wireless air interface based on the 5th generation mobile communication network technology (5G) standard, for example, the wireless air interface is a new air interface; alternatively, the wireless air interface may also be a wireless air interface based on the next generation mobile communication network technology standard of 5G.

In some examples, an end-to-end (E2E) connection may further be established between the terminals 11, for example, vehicle-to-vehicle (V2V) communication, vehicle-to-infrastructure (V2I) communication, vehicle-to-pedestrian (V2P) communication, and other scenarios in vehicle-to-everything (V2X) communication.

In some examples, the above wireless communication system may further contain a network management device 13.

The plurality of base stations 12 are respectively connected with the network management device 13. The network management device 13 may be a core network device in the wireless communication system. For example, the network management device 13 may be a mobility management entity (MME) in an evolved packet core (EPC) network. Alternatively, the network management device may also be other core network devices, such as a serving gateway (SGW), a public data network gateway (PGW), a policy and charging rules function (PCRF), or a home subscriber server (HSS). An implementation form of the network management device 13 is not limited in the examples of the disclosure.

Execution subjects involved in the example of the disclosure include, but are not limited to, UE such as mobile terminals supporting cellular mobile communications and base stations.

An application scenario of the example of the disclosure is that the type0 PUSCH resource configured by the base station for the UE is different each time, that is, bitmaps of the configured type0 PUSCH resources are different. Peak to average power ratios (PAPRs) of the PUSCH resources corresponding to the different bitmaps vary greatly, that is, a maximum value of the PAPRs of the type0 PUSCH resources and a minimum value of the PAPRs of the type0 PUSCH resources indicated by the base stations differ greatly, that is, the PAPRs of the different type0 PUSCH resources have a larger span. For eMBB UE, a solution with good linearity of an algorithm and a selected device can adapt to the situation of the larger PAPR span. In a case of a larger difference between the maximum value of the PAPRs and the minimum value of the PAPRs, UE design mainly considers the maximum value of the PAPRs, while network scheduling of the PUSCH resources is random. It needs to increase the UE design and the device cost to meet the worst case of the difference between the maximum value of the PAPRs and the minimum value of the PAPRs, thus increasing the complexity degree of the UE design.

Figure 2:
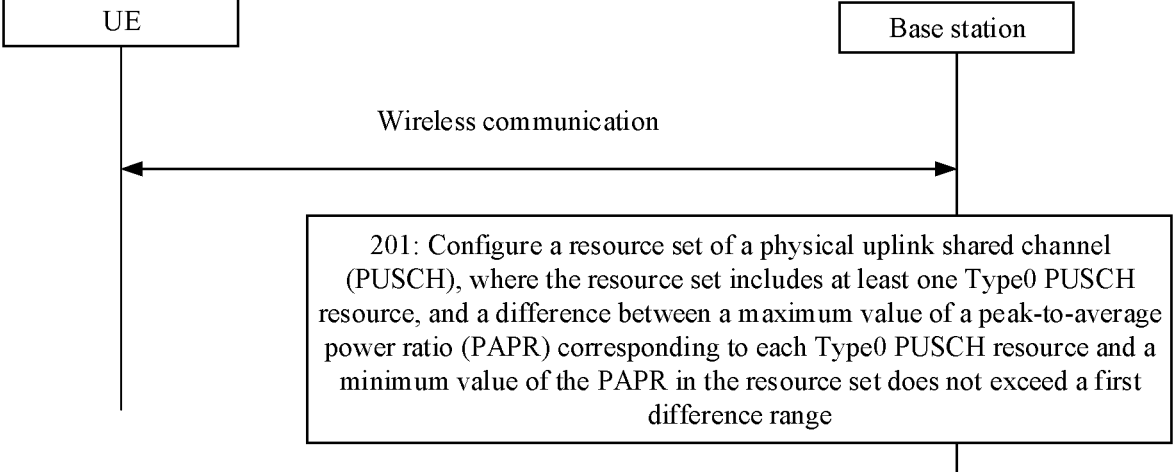
FIG. 2 is a schematic flow diagram of a resource configuration method shown according to an example.

As shown in FIG. 2, the present example provides a resource configuration method, which may be performed by a base station of a cellular mobile communication system, including the following step 201.

In step 201, a resource set of a physical uplink shared channel (PUSCH) is configured, where the resource set includes at least one Type0 PUSCH resource, and a difference between a maximum value of a peak-to-average power ratio (PAPR) corresponding to each Type0 PUSCH resource and a minimum value of the PAPR in the configured resource set does not exceed a first difference range.

Here, UE may be a mobile terminal that uses a cellular mobile communication technology for wireless communication. The base station may be a communication device that provides an access network interface to the UE in the cellular mobile communication system.

Here, the PUSCH resource is used for uplink control information and/or uplink data from the UE to the base station. Scheduling information of the PUSCH resource may be carried by downlink control information (DCI).

For a frequency domain resource, the base station may allocate the PUSCH resource to the UE based on a carrier bandwidth or a BWP bandwidth. For example, in an LTE, the base station allocates the PUSCH resource to the UE based on the carrier bandwidth. In an NR, the base station allocates the PUSCH resource to the UE based on a BWP activated by a current carrier.

The PUSCH resource may include a Type0 PUSCH resource and a Type1 PUSCH resource. The Type0 PUSCH resource allocated by the base station to the UE may be continuous or discontinuous in a frequency domain. The Type 0 PUSCH resource may be composed of a plurality of RBGs that are continuous and/or discontinuous in the frequency domain. One RBG contains a plurality of RBs. The Type1 PUSCH resource allocated by the base station to the UE may be continuous in the frequency domain.

In one example, the Type0 PUSCH resource is represented by a bitmap.

Each bit in the bitmap used to indicate the Type0 PUSCH resource indicates one RBG composed of a plurality of resource blocks (RBs). For example, a BWP bandwidth is 273 RB, an RBG size is 16RB, the bitmap may occupy 18 bits, and each bit indicates one RBG. The bitmap may use "1" to indicate the RBG allocated to the UE, and use "0" to indicate the RBG not allocated to the UE. The bitmap may also use "0" to indicate the RBG allocated to the UE, and use "1" to indicate the RBG not allocated to the UE.

The base station allocates the different Type0 PUSCH resources to the UE each time, that is, locations of the RBGs allocated each time, and/or the quantity of RBGs, and/or the quantity of the RBs in the single RBG are different. Thus, PAPRs of all the Type0 PUSCH resources are different. In order to reduce the distortion of signals under the different PAPRs, a signal amplification module of wireless signals in the UE needs to be able to meet the different PAPRs. The greater the difference between the maximum value of the PAPRs of the Type0 PUSCH resource and the minimum value of the PAPRs of the Type0 PUSCH resource allocated by the base station, the higher the demands for the signal amplification module, which will increase the cost and design difficulty of the signal amplification module.

Lightweight UE (Redcap, reduced capability NR devices) with low cost and a simple structure also needs to meet different PAPR Type0 PUSCH resource demands.

Here, a resource set composed of the at least one Type0 PUSCH resource may be established. The difference between the maximum value of a peak-to-average power ratio (PAPR) corresponding to each Type0 PUSCH resource and the minimum value of the PAPR in the resource set does not exceed a first difference range. The resource set may be set for a specific type of UE, such as the lightweight UE, and may also be set jointly for the different types of UE. The first difference range may be set based on a capability of the UE, that is, the first difference range is set based on the difference range between the maximum value in the PAPR and the minimum value in the PAPR that the UE may meet. When configuring the Type0 PUSCH resource for the UE, the base station may select from the resource set.

For example, a narrower first difference range may be set for the first type of UE such as the lightweight UE, and a wider first difference range may be set for the first type of UE, such as eMMB UE.

In this way, the difference between the maximum value in the PAPR of the Type0 PUSCH resource in the resource set and the minimum value in the PAPR of the Type0 PUSCH resource in the resource set is limited to limit the Type0 PUSCH resource that the base station may configure, so that the UE merely needs to design within a certain PAPR range, to reduce a complexity degree of UE design, and then reduce the UE cost.

Figure 3:
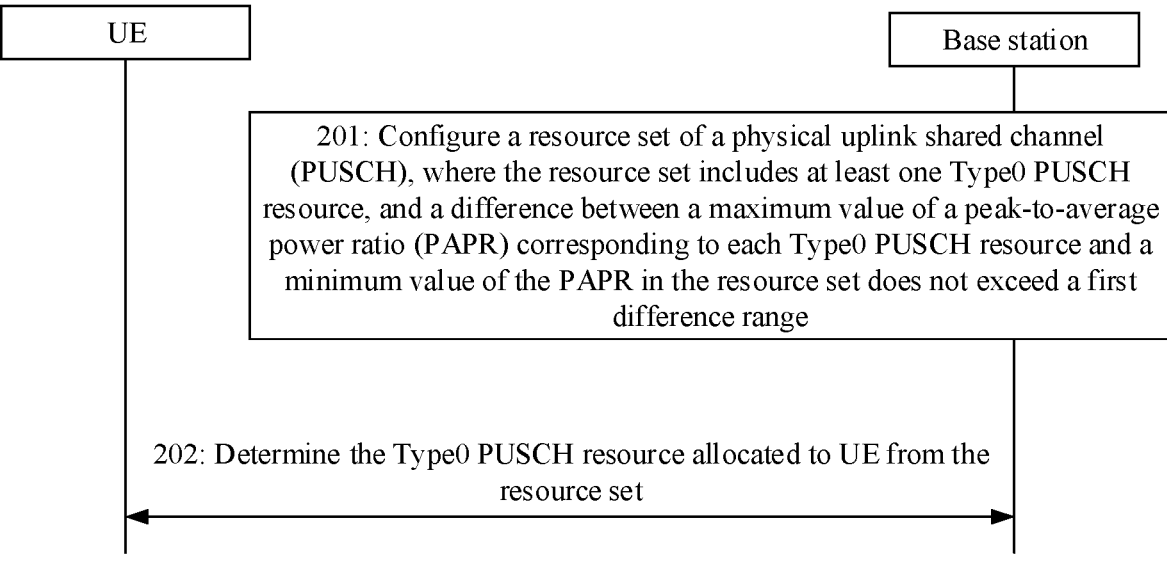
FIG. 3 is a schematic flow diagram of another resource configuration method shown according to an example.

In one example, as shown in FIG. 3, the method further includes the following step 202.

In step 202, the Type0 PUSCH resource allocated to the UE is determined from the resource set.

Here, the resource set may be configured before the base station allocates the Type0 PUSCH resource. The base station may determine the Type0 PUSCH resource allocated to the accessed UE in the resource set. The difference between the maximum value in the PAPR of the Type0 PUSCH resource in the resource set and the minimum value in the PAPR of the Type0 PUSCH resource in the resource set is limited to limit the Type0 PUSCH resource that the base station can configure, so that the UE merely needs to perform design within a certain PAPR range, to reduce the complexity degree of the UE design, and then reduce the UE cost.

In one example, the method further includes:

resource indication information indicating the Type0 PUSCH resource allocated to the UE is sent to the UE.

After the base station determines the Type0 PUSCH resource allocated to the UE, the resource indication information of the Type0 PUSCH resource may be sent to the UE. The Type0 PUSCH resource may be represented by the bitmap.

In one example, sending, to the UE, the resource indication information indicating the Type0 PUSCH resource allocated to the UE includes:

radio resource control (RRC) signaling carrying a bitmap corresponding to the Type0 PUSCH resource allocated to the UE is sent to the UE.

The bitmap corresponding to the Type0 PUSCH resource may be carried in the RRC signaling and sent to the UE.

The base station may use a reserved bit of existing RRC signaling to carry the bitmap corresponding to the Type0 PUSCH resource, so as to improve the utilization efficiency of the existing RRC signaling.

The base station may also use a dedicated RRC signaling to carry the bitmap corresponding to the Type0 PUSCH resource.

In one example, the method further includes:

capability indication information reported by the UE is received; and based on the capability indication information, a second difference range between the maximum value of the PAPR of the Type0 PUSCH resource allowed by the UE and the minimum value of the PAPR of the Type0 PUSCH resource allowed by the UE and/or a type of the UE are/is determined.

When the UE accesses the base station, the capability indication information may be sent to the base station. Here, the capability indication information may be used to indicate a processing capability of the UE for the PAPR of the Type0 PUSCH resource, that is, the second difference range between the maximum value of the PAPR and the minimum value of the PAPR that the signal amplification module of the UE can allow. The capability indication information may also be used to indicate the type of the UE. The different second difference ranges allowed by the signal amplification modules of the different types of UE may be different.

The base station may select the Type0 PUSCH resource corresponding to the UE capability from the resource set based on the capability indication information.

In one example, determining the Type0 PUSCH resource allocated to the UE from the resource set includes:

determining a bitmask associated with the second difference range and/or a bitmask associated with the type of the UE;

performing mask processing on a bitmap corresponding to the Type0 PUSCH resource selected from the resource set and associated with the UE with the bitmask; and a target bitmap obtained by mask processing is determined as a bitmap representing the Type0 PUSCH resource allocated to the UE.

Here, the bitmask may be a bitmap. When the bitmask is used for mask processing, one or more bits of the bitmap corresponding to the Type0 PUSCH resource may be set. The setting here may be either to set bit "1" to "0" or to set bit "0" to "1". The bitmask may set one or more configured RBGs of the bitmap to unconfigured RBGs. In this way, the PAPR of the configured Type0 PUSCH resource may be adjusted. The bitmask may be determined by the base station.

The bitmask may be set corresponding to the second difference range and/or a bitmask associated with the type of the UE, so that the configured Type0 PUSCH resource meets the second difference range, and/or an acceptable difference range of the type of the UE. The resource set may be configured by the base station for the first difference range. If the second difference range indicated by the capability indication information reported by the UE is less than the first difference range, the difference range of the Type0 PUSCH resource in the resource set allocated by the base station to the UE may exceed the processing capability of the UE. The base station may set the corresponding bitmask for the second difference range. After selecting the Type0 PUSCH resource from the resource set, the base station may perform mask processing on the bitmap of the selected Type0 PUSCH resource with the bitmask to reduce the allocated Type0 PUSCH resource. In this way, the difference range of the Type0 PUSCH resource allocated to UE is reduced to meet the demands of the UE with poor capability.

The resource set may also be jointly configured by the base station for the plurality of UE types. If the difference range of the PAPR acceptable by the UE type indicated by the capability indication information reported by the UE is less than the first difference range, the difference range of the Type0 PUSCH resource in the resource set allocated by the base station to the UE may exceed the processing capability of the UE. The base station may set the corresponding bitmask for the UE type. After selecting the Type0 PUSCH resource from the resource set, the base station may perform mask processing on the bitmap of the selected Type0 PUSCH resource with the bitmask to reduce the allocated Type0 PUSCH resource. In this way, the difference range of the Type0 PUSCH resource allocated to UE is reduced to meet the demands of the UE type with different capabilities.

In one example, determining the Type0 PUSCH resource allocated to the UE from the resource set includes:
   a resource subset associated with the type of the UE in the resource set is determined based on the second difference range and/or a bitmask associated with the type of the UE, where the resource subset corresponding to the capability of the UE includes the at least one Type0 PUSCH resource; and
   the Type PUSCH resource allocated to the UE is determined from the resource subset.

The resource set may be configured by the base station for the first difference range. If the second difference range indicated by the capability indication information reported by the UE is less than the first difference range, the difference range of the Type0 PUSCH resource in the resource set allocated by the base station to the UE may exceed the processing capability of the UE. The base station may select the resource subset composed of the Type0 PUSCH resource from the resource set based on the second difference range. The difference between the maximum value of the PAPR of the Type0 PUSCH resource in the resource subset and the minimum value of the PAPR of the Type0 PUSCH resource in the resource subset may be less than the second difference range. The base station may select the Type0 PUSCH resource allocated to the UE from the resource subset. In this way, the difference range of the Type0 PUSCH resource allocated to UE is reduced to meet the demands of the UE with poor capability.

The resource set may also be jointly configured by the base station for the plurality of UE types. If the difference range of the PAPR acceptable by the UE type indicated by the capability indication information reported by the UE is less than the first difference range, the difference range of the Type0 PUSCH resource in the resource set allocated by the base station to the UE may exceed the processing capability of the UE. The base station may select the resource subset composed of the Type0 PUSCH resource from the resource set based on the UE type. The difference between the maximum value of the PAPR of the Type0 PUSCH resource in the resource subset and the minimum value of the PAPR of the Type0 PUSCH resource in the resource subset may be less than the difference range acceptable by the UE type. The base station may select the Type0 PUSCH resource allocated to the UE from the resource subset. In this way, the difference range of the Type0 PUSCH resource allocated to UE is reduced to meet the demands of the UE type with different capabilities.

In one example, selecting the Type PUSCH resource allocated to the UE from the resource set includes:
   a bitmask reported by the UE is received;
   mask processing is performed on a bitmap corresponding to the Type0 PUSCH resource selected from the resource set and associated with the UE with the bitmask; and
   a target bitmap obtained by mask processing is determined as a bitmap representing the Type0 PUSCH resource allocated to the UE.

Here, the bitmask may be determined by the UE and sent to the base station. The bitmask may be determined by the UE based on its own capabilities, or may also be pre-configured based on the capability of the UE and/or the UE type. After selecting the Type0 PUSCH resource from the resource set, the base station may perform mask processing on the bitmap of the selected Type0 PUSCH resource with the bitmask to reduce the allocated Type0 PUSCH resource. In this way, the difference range of the Type0 PUSCH resource allocated to UE is reduced to meet the demands of the UE with poor capability.

In one example, the resource set is determined based on indication information reported by the at least one UE for indicating the capability of the UE.

Here, the resource set may be determined by the base station based on the indication information reported by the at least one UE for indicating the capability of the UE. The different UEs may report their own acceptable PAPR difference ranges. The base station may also determine the PAPR difference range acceptable by the UE based on the UE type reported by the UE. The base station may determine the Type PUSCH resource in the resource set based on the PAPR difference range acceptable by the UE.

In one example, the Type0 PUSCH resource belongs to a Type0 PUSCH resource complete set, where
   the Type0 PUSCH resource complete set is specified by a communication protocol, and/or pre-agreed.

The Type0 PUSCH resource complete set may be specified by the communication protocol, and/or pre-agreed. The resource set configured by the base station may be a finite set, and the resource set may be tailored based on the complete set to become the finite set, or called a resource cluster.

As shown in FIG. 4, the present example provides a resource configuration method, which can be performed by the user equipment of a cellular mobile communication system, including the following step 401.

In step 401: resource indication information of a Type0 PUSCH resource allocated to a physical uplink shared channel (PUSCH) of UE and sent by a base station is received, where the Type0 PUSCH resource is determined by the base station from a resource set, the resource set includes the at least one Type0 PUSCH resource, and a difference between a maximum value of a peak-to-average power ratio (PAPR) corresponding to each Type0 PUSCH resource and a minimum value of the PAPR in the resource set does not exceed a first difference range.

Here, the UE may be a mobile terminal that uses a cellular mobile communication technology for wireless communication. The base station may be a communication device that provides an access network interface to the UE in the cellular mobile communication system.

Here, the PUSCH resource is used for uplink control information and/or uplink data from the UE to the base station. Scheduling information of the PUSCH resource may be carried by downlink control information (DCI).

For a frequency domain resource, the base station may allocate the PUSCH resource to the UE based on a carrier bandwidth or a BWP bandwidth. For example, in an LTE, the base station allocates the PUSCH resource to the UE based on the carrier bandwidth. In an NR, the base station allocates the PUSCH resource to the UE based on a BWP activated by a current carrier.

The PUSCH resource may include the Type0 PUSCH resource and a Type1 PUSCH resource. The Type0 PUSCH resource allocated by the base station to the UE may be continuous or discontinuous in a frequency domain. The Type 0 PUSCH resource may be composed of a plurality of RBGs that are continuous and/or discontinuous in the frequency domain. One RBG contains a plurality of RBs. The Type1 PUSCH resource allocated by the base station to the UE may be continuous in the frequency domain.

In one example, the Type0 PUSCH resource is represented by a bitmap.

Each bit in the bitmap used to indicate the Type0 PUSCH resource indicates one RBG composed of the plurality of resource blocks (RBs). For example, the BWP bandwidth is 273 RB, an RBG size is 16RB, the bitmap may occupy 18 bits, and each bit indicates one RBG. The bitmap may use "1" to indicate the RBG allocated to the UE, and use "0" to indicate the RBG not allocated to the UE. The bitmap may also use "0" to indicate the RBG allocated to the UE, and use "1" to indicate the RBG not allocated to the UE.

The base station allocates the different Type0 PUSCH resources to the UE each time, that is, locations of the RBGs allocated each time, and/or the quantity of RBGs, and/or the quantity of the RBs in the single RBG are different. Thus, PAPRs of all the Type0 PUSCH resources are different. In order to reduce the distortion of signals under the different PAPRs, a signal amplification module of wireless signals in the UE needs to be able to meet the different PAPRs. The greater the difference between the maximum value of the PAPRs of the Type0 PUSCH resource and the minimum value of the PAPRs of the Type0 PUSCH resource allocated by the base station, the higher the demands for the signal amplification module, which will increase the cost and design difficulty of the signal amplification module.

Lightweight UE (Redcap, reduced capability NR devices) with low cost and a simple structure also needs to meet different PAPR Type0 PUSCH resource demands.

Here, a resource set composed of the at least one Type0 PUSCH resource may be established. The difference between the maximum value of a peak-to-average power ratio (PAPR) corresponding to each Type0 PUSCH resource and the minimum value of the PAPR in the resource set does not exceed a first difference range. The resource set may be set for a specific type of UE, such as the lightweight UE, and may also be set jointly for the different types of UE. The first difference range may be set based on a capability of the UE. That is, the first difference range is set based on the difference range between the maximum value in the PAPR and the minimum value in the PAPR that the UE can meet. When configuring the Type0 PUSCH resource for the UE, the base station may select from the resource set.

After the base station determines the Type0 PUSCH resource allocated to the UE, the resource indication information of the Type0 PUSCH resource may be sent to the UE. The Type0 PUSCH resource may be represented by the bitmap.

For example, a narrower first difference range may be set for the first type of UE such as the lightweight UE, and a wider first difference range may be set for the first type of UE, such as eMMB UE.

In this way, the difference between the maximum value in the PAPR of the Type0 PUSCH resource in the resource set and the minimum value in the PAPR of the Type0 PUSCH resource in the resource set is limited to limit the Type0 PUSCH resource that the base station can configure, so that the UE merely needs to perform design within the certain PAPR range, to reduce the complexity degree of the UE design, and then reduce the UE cost.

In one example, receiving the resource indication information of the Type0 PUSCH resource allocated to the PUSCH of the UE and sent by the base station includes:

RRC signaling carrying a bitmap corresponding to the Type0 PUSCH resource allocated to the UE is received.

The bitmap corresponding to the Type0 PUSCH resource may be carried in the RRC signaling and sent to the UE.

The base station may use a reserved bit of existing RRC signaling to carry the bitmap corresponding to the Type0 PUSCH resource, so as to improve the utilization efficiency of the existing RRC signaling.

The base station may also use a dedicated RRC signaling to carry the bitmap corresponding to the Type0 PUSCH resource.

In one example, the method further includes at least one of the following:

capability indication information indicating the capability of the UE is sent to the base station, where the capability indication information is configured to indicate a second difference range between the maximum value of the PAPR of the Type0 PUSCH resource allowed by the UE and the minimum value of the PAPR of the Type0 PUSCH resource allowed by the UE and/or a type of the UE; and a bitmask is sent to the base station, where the bitmask is associated with the second difference range and/or a bitmask associated with the type of the UE.

When the UE accesses the base station, the capability indication information may be sent to the base station. Here, the capability indication information may be used to indicate a processing capability of the UE for the PAPR of the Type0 PUSCH resource, that is, the second difference range between the maximum value of the PAPR and the minimum value of the PAPR that the signal amplification module of the UE can allow. The capability indication information may also be used to indicate the type of UE. The different second difference ranges allowed by the signal amplification modules of the different types of UE may be different.

The base station may select the Type0 PUSCH resource corresponding to the UE capability from the resource set based on the capability indication information.

Here, the bitmask may be a bitmap. When the bitmask is used for mask processing, one or more bits of the bitmap corresponding to the Type0 PUSCH resource may be set. The setting here may be either to set bit "1" to "0" or to set bit "0" to "1". The bitmask may set one or more configured RBGs of the bitmap to unconfigured RBGs. In this way, the PAPR of the configured Type0 PUSCH resource may be adjusted. The bitmask may be determined by the base station or the UE.

The bitmask may be set corresponding to the second difference range and/or a bitmask associated with the type of the UE, so that the configured Type0 PUSCH resource meets the second difference range, and/or an acceptable difference range of the type of the UE.

The resource set may be configured by the base station for the first difference range. If the second difference range indicated by the capability indication information reported by the UE is less than the first difference range, the difference range of the Type0 PUSCH resource in the resource set allocated by the base station to the UE may exceed the processing capability of the UE. The base station may set the corresponding bitmask for the second difference range. After selecting the Type0 PUSCH resource from the resource set, the base station may perform mask processing on the bitmap of the selected Type0 PUSCH resource with the bitmask to reduce the allocated Type0 PUSCH resource. In this way, the difference range of the Type0 PUSCH resource allocated to the UE is reduced to meet the demands of the UE with poor capability.

The resource set may also be jointly configured by the base station for the plurality of UE types. If the difference range of the PAPR acceptable by the UE type indicated by the capability indication information reported by the UE is less than the first difference range, the difference range of the Type0 PUSCH resource in the resource set allocated by the base station to the UE may exceed the processing capability of the UE. The base station may set the corresponding bitmask for the UE type. After selecting the Type0 PUSCH resource from the resource set, the base station may perform mask processing on the bitmap of the selected Type0 PUSCH resource with the bitmask to reduce the allocated Type PUSCH resource. In this way, the difference range of the Type0 PUSCH resource allocated to UE is reduced to meet the demands of the UE type with different capabilities.

Here, the bitmask may be determined by the UE and sent to the base station. The bitmask may be determined by the UE based on its own capabilities, or may also be preconfigured based on the capability of the UE and/or the UE type. After selecting the Type PUSCH resource from the resource set, the base station may perform mask processing on the bitmap of the selected Type0 PUSCH resource with the bitmask to reduce the allocated Type0 PUSCH resource. In this way, the difference range of the Type0 PUSCH resource allocated to the UE is reduced to meet the demands of the UE with poor capability.

In one example, the Type0 PUSCH resource belongs to a Type0 PUSCH resource complete set, where the Type0 PUSCH resource complete set is specified by a communication protocol, and/or, pre-agreed.

The Type0 PUSCH resource complete set may be specified by the communication protocol, and/or, pre-agreed. The resource set configured by the base station may be a finite set, and the resource set may be tailored based on the complete set to become the finite set, or called a resource cluster.

A specific example is provided below in combination with any of the above examples:

the base station configures the PUSCH Type0 resource set for the specific type of UE, a difference between a maximum value of the PAPR of the set and a minimum value of the PAPR of the set is controlled in a certain range, and protocol representation corresponding to the range is an actual value of the set.

The resource set may be determined according to the capability information reported by the UE.

The resource set may further be a determined finite set, which is tailored by a protocol according to the complete set to become the finite set, or a resource cluster.

The base station may directly select the PUSCH Type0 resource bitmap from the resource set for the UE to use.

The UE reports the capability information, and the base station determines the bitmask based on the capability information, and sends the selected bitmask after mask processing to the UE for use.

The UE reports the bitmask, and the base station performs mask processing on the selected bitmap with the reported bitmask and then sends it to the UE for use.

To define the UE, the PUSCH Type0 capability information needs to be reported. For example, 1-2 types of optional sets are defined, the UE reports a certain type, and the base station performs configuration according to a bitmap subset corresponding to this type.

Figure 5:
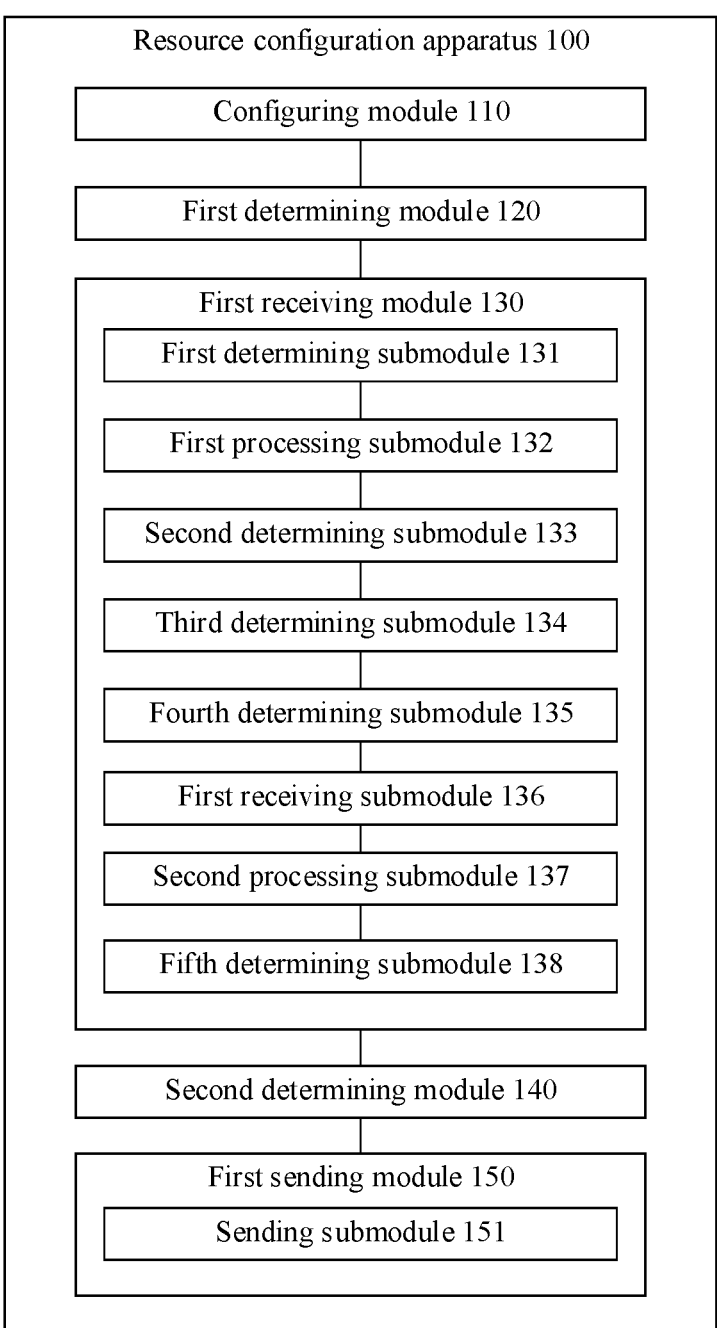
FIG. 5 is a block diagram of a resource configuration apparatus shown according to an example.

An example of the disclosure further provides a resource configuration apparatus, applied to a base station of wireless communication. As shown in FIG. 5, the resource configuration apparatus 100 includes: a configuring module 110.

The configuring module 110 is configured to configure a resource set of a physical uplink shared channel (PUSCH), the resource set includes at least one Type0 PUSCH resource, and a difference between a maximum value of a peak-to-average power ratio (PAPR) corresponding to each Type0 PUSCH resource and a minimum value of the PAPR in the configured resource set does not exceed a first difference range.

In one example, the Type0 PUSCH resource is represented by a bitmap.

In one example, the resource configuration apparatus 100 further includes:

a first determining module 120 configured to determine the Type0 PUSCH resource allocated to UE from the resource set.

In one example, the resource configuration apparatus 100 further includes:

a first receiving module 130 configured to receive capability indication information reported by the UE; and a second determining module 140 configured to determine, based on the capability indication information, a second difference range between the maximum value of the PAPR of the Type0 PUSCH resource allowed by the UE and the minimum value of the PAPR of the Type0 PUSCH resource allowed by the UE and/or a type of the UE.

In one example, the first receiving module 130 includes:

a first determining submodule 131 configured to determine a bitmask associated with the second difference range and/or a bitmask associated with the type of the UE;

a first processing submodule 132 configured to perform mask processing on a bitmap corresponding to the Type0 PUSCH resource selected from the resource set and associated with the UE with the bitmask; and a second determining submodule 133 configured to determine a target bitmap obtained by mask processing as a bitmap representing the Type0 PUSCH resource allocated to the UE.

In one example, the first receiving module 130 includes:

a third determining submodule 134 configured to determine a resource subset associated with the type of the UE in the resource set based on the second difference range and/or a bitmask associated with the type of the UE, where the resource subset corresponding to a capability of the UE includes the at least one Type0 PUSCH resource; and a fourth determining submodule 135 configured to determine the Type0 PUSCH resource allocated to the UE from the resource subset.

In one example, the first receiving module 130 includes:

a first receiving submodule 136 configured to receive a bitmask reported by the UE;

a second processing submodule 137 configured to perform mask processing on a bitmap corresponding to the Type0 PUSCH resource selected from the resource set and associated with the UE with the bitmask; and a fifth determining submodule 138 configured to determine a target bitmap obtained by mask processing as a bitmap representing the Type0 PUSCH resource allocated to the UE.

In one example, the resource configuration apparatus 100 further includes:

a first sending module 150 configured to send, to the UE, resource indication information indicating the Type0 PUSCH resource allocated to the UE.

In one example, the first sending module 150 includes:

a sending submodule 151 configured to send, to the UE, RRC signaling carrying a bitmap corresponding to the Type0 PUSCH resource allocated to the UE.

In one example, the resource set is determined based on indication information reported by the at least one UE for indicating the capability of the UE.

In one example, the Type0 PUSCH resource belongs to a Type0 PUSCH resource complete set, where the Type0 PUSCH resource complete set is specified by a communication protocol, and/or, pre-agreed.

Figure 6:
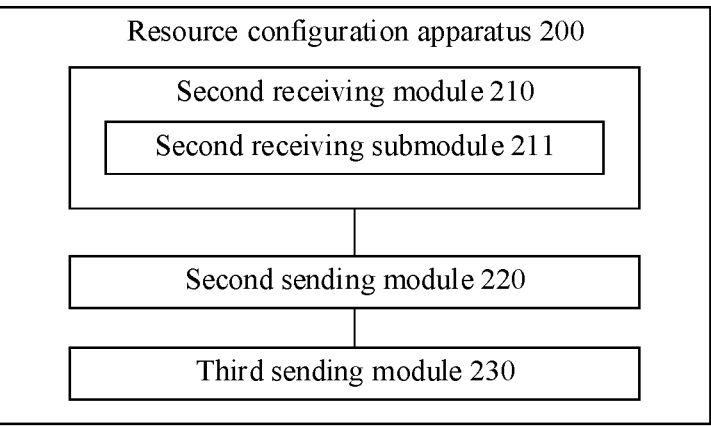
FIG. 6 is a block diagram of another resource configuration apparatus shown according to an example.

An example of the disclosure further provides a resource configuration apparatus, applied to the UE of wireless communication. As shown in FIG. 6, the resource configuration apparatus 200 includes: a second receiving module 210.

The second receiving module 210 is configured to receive resource indication information of a Type0 PUSCH resource allocated to a physical uplink shared channel (PUSCH) of the UE and sent by a base station, where the Type0 PUSCH resource is determined by the base station from a resource set, the resource set includes the at least one Type0 PUSCH resource, and a difference between a maximum value of a peak-to-average power ratio (PAPR) corresponding to each Type0 PUSCH resource and a minimum value of the PAPR in the resource set does not exceed a first difference range.

In one example, the Type0 PUSCH resource is represented by a bitmap.

In one example, the second receiving module 210 includes:

a second receiving submodule 211 configured to receive RRC signaling carrying a bitmap corresponding to the Type0 PUSCH resource allocated to the UE.

In one example, the resource configuration apparatus 200 further includes at least one of the following:

a second sending module 220 configured to send capability indication information indicating the capability of the UE to the base station, where the capability indication information is configured to indicate a second difference range between the maximum value of the PAPR of the Type0 PUSCH resource allowed by the UE and the minimum value of the PAPR of the Type0 PUSCH resource allowed by the UE and/or a type of the UE; and a third sending module 230 configured to send a bitmask to the base station, where the bitmask is associated with the second difference range and/or a bitmask associated with the type of the UE.

In one example, the Type0 PUSCH resource belongs to a Type0 PUSCH resource complete set, where the Type0 PUSCH resource complete set is specified by a communication protocol, and/or, pre-agreed.

In an example, the configuring module 110, the first determining module 120, the first receiving module 130, the second determining module 140, the first sending module 150, the second receiving module 210, the second sending module 220, the third sending module 230 and the like may be implemented by one or more central processing units (CPUs), graphics processing units (GPUs), baseband processors (BPs), application specific integrated circuits (ASICs), DSPs, programmable logic devices (PLDs), complex programmable logic devices (CPLDs), field programmable gate arrays (FPGAs), general processors, controllers, microcontroller units (MCUs), microprocessors, or other electronic components, for executing the aforementioned method.

Figure 7:
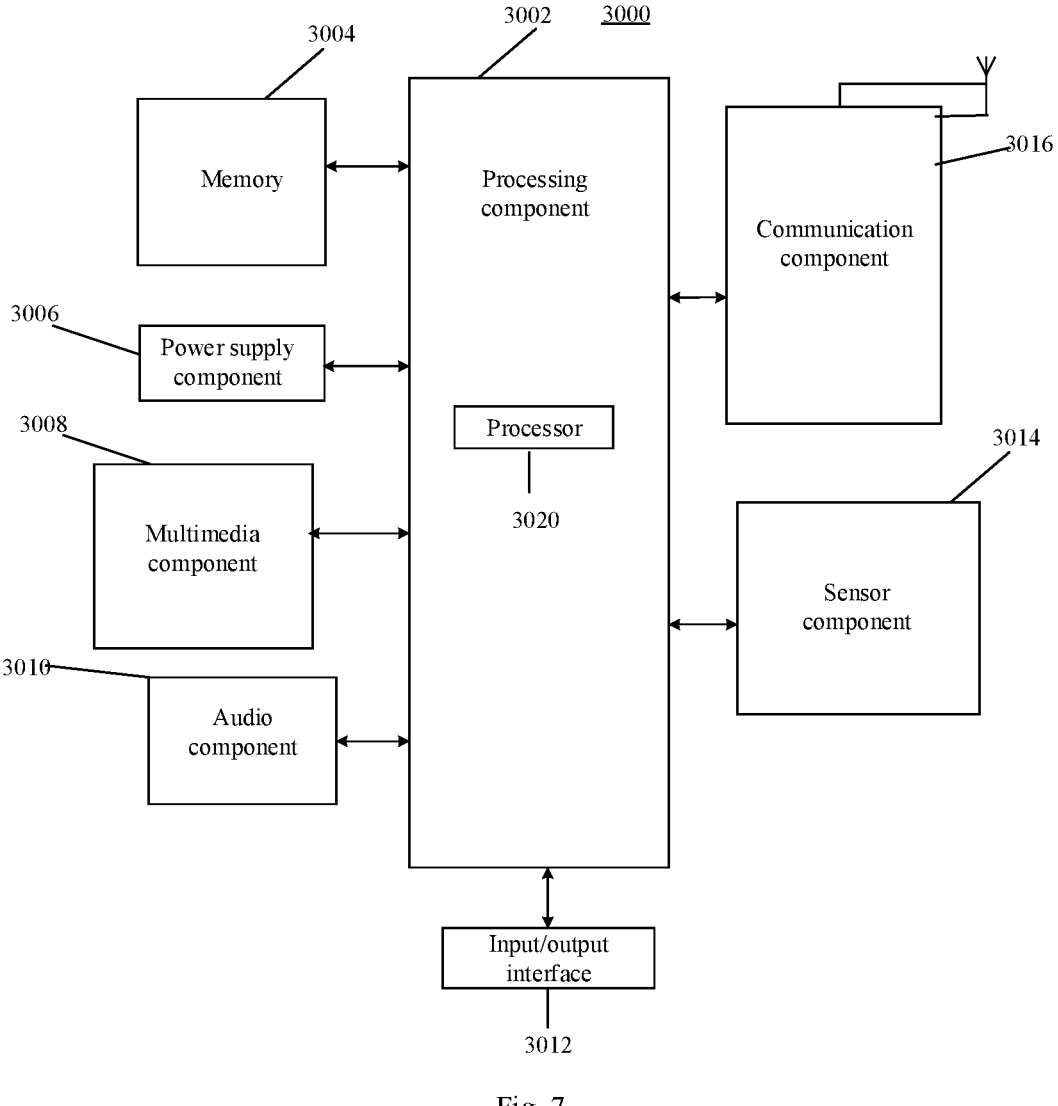
FIG. 7 is a block diagram of an apparatus for resource configuration shown according to an example.

FIG. 7 is a block diagram of an apparatus 3000 for resource configuration shown according to an example. For example, the apparatus 3000 may be a mobile telephone, a computer, a digital broadcast terminal, a message transceiving device, a game console, a tablet device, a medical device, a fitness device, a personal digital assistant, and the like.

Referring to FIG. 7, the apparatus 3000 may include one or more of the following components: a processing component 3002, a memory 3004, a power supply component 3006, a multimedia component 3008, an audio component 3010, an input/output (I/O) interface 3012, a sensor component 3014, and a communication component 3016.

The processing component 3002 usually controls the overall operation of the apparatus 3000, such as operations associated with displaying, telephone calling, data communication, a camera operation, and a record operation. The processing component 3002 may include one or more processors 3020 to execute an instruction, so as to complete all or part of steps of the above method. In addition, the processing component 3002 may include one or more modules, so as to facilitate interaction between the processing component 3002 and other components. For example, the processing component 3002 may include a multimedia module, so as to facilitate interaction between the multimedia component 3008 and the processing component 3002.

The memory 3004 is configured to store various types of data so as to support operation on the apparatus 3000. Examples of these data include instructions of any application program or method used to be operated on the apparatus 3000, contact data, telephone directory data, messages, pictures, videos, and the like. The memory 3004 may be implemented by any type of volatile or nonvolatile storage device or their combinations, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 3006 provides electric power for various components of the apparatus 3000. The power supply component 3006 may include a power management system, one or more power supplies, and other components associated with generating, managing, and distributing electric power for the apparatus 3000.

The multimedia component 3008 includes a screen providing an output interface between the apparatus 3000 and a user. In some examples, the screen may include a liquid crystal display (LCD) and a touch panel (TP). If the screen includes the touch panel, the screen may be implemented as a touch screen so as to receive an input signal from the user. The touch panel includes one or more touch sensors to sense touching, swiping, and gestures on the touch panel. The touch sensor may not only sense a boundary of a touching or swiping action, but also detect duration and pressure related to the touching or swiping operation. In some examples, the multimedia component 3008 includes a front camera and/or a back camera. When the apparatus 3000 is in an operation mode, such as a shooting mode or a video mode, the front camera and/or the back camera may receive external multimedia data. Each front camera and each back camera may have a fixed optical lens system or have a focal length and optical zooming capability.

The audio component 3010 is configured to output and/or input an audio signal. For example, the audio component 3010 includes a microphone (MIC). When the apparatus 3000 is in an operation mode, such as a call mode, a recording mode, or a voice recognition mode, the microphone is configured to receive an external audio signal. The received audio signal may be further stored in the memory 3004 or sent via the communication component 3016. In some examples, the audio component 3010 further includes a speaker for outputting the audio signal.

The I/O interface 3012 provides an interface between the processing component 3002 and a peripheral interface module, and the above peripheral interface module may be a keyboard, a click wheel, buttons, etc. These buttons may include, but are not limited to: a home button, a volume button, a start button, and a lock button.

The sensor component 3014 includes one or more sensors for providing state evaluations of all aspects for the apparatus 3000. For example, the sensor component 3014 may detect a turn-on/turn-off state of the apparatus 3000 and relative positioning of components, for example, the components are a display and a keypad of the apparatus 3000. The sensor component 3014 may further detect position change of the apparatus 3000 or one component of the apparatus 3000, whether there is contact between the user and the apparatus 3000, azimuth or acceleration/deceleration of the apparatus 3000, and temperature change of the apparatus 3000. The sensor component 3014 may include a proximity sensor, which is configured to detect existence of a nearby object without any physical contact. The sensor component 3014 may further include an optical sensor, such as a CMOS or CCD image sensor, for use in an imaging application. In some examples, the sensor component 3014 may further include an acceleration sensor, a gyroscope sensor, a magnetic sensor, a pressure sensor, or a temperature sensor.

The communication component 3016 is configured to facilitate wired or wireless communication between the apparatus 3000 and other devices. The apparatus 3000 may access a wireless network based on a communication standard, such as WiFi, 2G, 3G, or their combination. In one example, the communication component 3016 receives a broadcast signal or broadcast-related information from an external broadcast management system via a broadcast channel. In an example, the communication component 3016 further includes a near-field communication (NFC) module so as to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In the example, the apparatus 3000 may be implemented by one or more application specific integrated circuits (ASICs), digital signal processors (DSPs), digital signal processing devices (DSPDs), programmable logic devices (PLDs), field-programmable gate arrays (FPGAs), controllers, microcontrollers, microprocessors or other electronic elements for executing the above method.

In the example, a non-temporary computer-readable storage medium including instructions is further provided, such as a memory 3004 including instructions. The above instructions may be executed by a processor 3020 of the apparatus 3000 so as to complete the above method. For example, the non-transitory computer-readable storage medium may be a ROM, a random access memory (RAM), a CD-ROM, a magnetic tape, a floppy disk, an optical data storage device, and the like.

Those of skill in the art will easily figure out other implementation solutions of examples of the disclosure after considering the specification and practicing the invention disclosed here. The disclosure intends to cover any transformation, usage, or adaptive change of the examples of the disclosure, and these transformations, usages, or adaptive changes conform to a general principle of the examples of the disclosure and include common general knowledge or conventional technical means which are not disclosed in the examples of the disclosure in the technical field. The specification and the examples are merely regarded as an example, and the true scope and spirit of the examples of the disclosure are indicated by the following claims.

It will be appreciated that the examples of the disclosure are not limited to the exact construction that has been described above and shown in the accompanying drawings, and that various modifications and changes may be made without departing from its scope. The scope of the examples of the disclosure is limited merely by the appended claims.

According to a first aspect of an example of the disclosure, a resource configuration method is provided and performed by a base station. The method includes:

configuring a resource set of a physical uplink shared channel (PUSCH), where the resource set includes at least one Type0 PUSCH resource, and a difference between a maximum value of a peak-to-average power ratio (PAPR) corresponding to each Type0 PUSCH resource and a minimum value of the PAPR in the configured resource set does not exceed a first difference range.

In one example, the Type0 PUSCH resource is represented by a bitmap.

In one example, the method further includes:

determining the Type0 PUSCH resource allocated to UE from the resource set.

In one example, the method further includes:

receiving capability indication information reported by the UE; and determining, based on the capability indication information, a second difference range between the maximum value of the PAPR of the Type0 PUSCH resource allowed by the UE and the minimum value of the PAPR of the Type0 PUSCH resource allowed by the UE and/or a type of the UE.

In one example, determining the Type0 PUSCH resource allocated to the UE from the resource set includes:

determining a bitmask associated with the second difference range and/or a bitmask associated with the type of the UE;

performing mask processing on a bitmap corresponding to the Type0 PUSCH resource selected from the resource set and associated with the UE with the bitmask; and determining a target bitmap obtained by mask processing as a bitmap representing the Type0 PUSCH resource allocated to the UE.

In one example, determining the Type0 PUSCH resource allocated to the UE from the resource set includes:

determining a resource subset associated with the type of the UE in the resource set based on the second difference range and/or a bitmask associated with the type of the UE, where the resource subset corresponding to a capability of the UE includes the at least one Type0 PUSCH resource; and determining the Type0 PUSCH resource allocated to the UE from the resource subset.

In one example, selecting the Type0 PUSCH resource allocated to the UE from the resource set includes:

receiving a bitmask reported by the UE;

performing mask processing on a bitmap corresponding to the Type0 PUSCH resource selected from the resource set and associated with the UE with the bitmask; and determining a target bitmap obtained by mask processing as a bitmap representing the Type0 PUSCH resource allocated to the UE.

In one example, the method further includes:

sending, to the UE, resource indication information indicating the Type0 PUSCH resource allocated to the UE.

In one example, sending, to the UE, the resource indication information indicating the Type0 PUSCH resource allocated to the UE includes:

sending, to the UE, RRC signaling carrying a bitmap corresponding to the Type0 PUSCH resource allocated to the UE.

In one example, the resource set is determined based on indication information reported by the at least one UE for indicating the capability of the UE.

In one example, the Type0 PUSCH resource belongs to a Type0 PUSCH resource complete set, where the Type0 PUSCH resource complete set is specified by a communication protocol, and/or, pre-agreed.

According to a second aspect of an example of the disclosure, a resource configuration method is provided and performed by user equipment (UE). The method includes:

receiving resource indication information of a Type0 PUSCH resource allocated to a physical uplink shared channel (PUSCH) of the UE and sent by a base station, where the Type0 PUSCH resource is determined by the base station from a resource set, the resource set includes the at least one Type0 PUSCH resource, and a difference between a maximum value of a peak-to-average power ratio (PAPR) corresponding to each Type0 PUSCH resource and a minimum value of the PAPR in the resource set does not exceed a first difference range.

In one example, the Type0 PUSCH resource is represented by a bitmap.

In one example, receiving the resource indication information of the Type0 PUSCH resource allocated to the PUSCH of the UE and sent by the base station includes:

receiving RRC signaling carrying a bitmap corresponding to the Type0 PUSCH resource allocated to the UE.

In one example, the method further includes at least one of the following:

sending capability indication information indicating the capability of the UE to the base station, where the capability indication information is configured to indicate a second difference range between the maximum value of the PAPR of the Type0 PUSCH resource allowed by the UE and the minimum value of the PAPR of the Type0 PUSCH resource allowed by the UE and/or a type of the UE; and sending a bitmask to the base station, where the bitmask is associated with the second difference range and/or a bitmask associated with the type of the UE.

In one example, the Type0 PUSCH resource belongs to a Type0 PUSCH resource complete set, where the Type0 PUSCH resource complete set is specified by a communication protocol, and/or, pre-agreed.

According to a third aspect of an example of the disclosure, a resource configuration apparatus is provided and applied to a base station. The apparatus includes: a configuring module, where the configuring module is configured to configure a resource set of a physical uplink shared channel (PUSCH), the resource set includes at least one Type0 PUSCH resource, and a difference between a maximum value of a peak-to-average power ratio (PAPR) corresponding to each Type0 PUSCH resource and a minimum value of the PAPR in the configured resource set does not exceed a first difference range.

In one example, the Type0 PUSCH resource is represented by a bitmap.

In one example, the apparatus further includes:

a first determining module configured to determine the Type0 PUSCH resource allocated to UE from the resource set.

In one example, the apparatus further includes:

a first receiving module configured to receive capability indication information reported by the UE; and a second determining module configured to determine, based on the capability indication information, a second difference range between the maximum value of the PAPR of the Type0 PUSCH resource allowed by the UE and the minimum value of the PAPR of the Type0 PUSCH resource allowed by the UE and/or a type of the UE.

In one example, the first determining module includes:

a first determining submodule configured to determine a bitmask associated with the second difference range and/or a bitmask associated with the type of the UE;

a first processing submodule configured to perform mask processing on a bitmap corresponding to the Type0 PUSCH resource selected from the resource set and associated with the UE with the bitmask; and a second determining submodule configured to determine a target bitmap obtained by mask processing as a bitmap representing the Type0 PUSCH resource allocated to the UE.

In one example, the first determining module includes:

a third determining submodule configured to determine a resource subset associated with the type of the UE in the resource set based on the second difference range and/or a bitmask associated with the type of the UE, where the resource subset corresponding to a capability of the UE includes the at least one Type0 PUSCH resource; and a fourth determining submodule configured to determine the Type0 PUSCH resource allocated to the UE from the resource subset.

In one example, the first determining module includes:

a first receiving submodule configured to receive a bitmask reported by the UE;

a second processing submodule configured to perform mask processing on a bitmap corresponding to the Type0 PUSCH resource selected from the resource set and associated with the UE with the bitmask; and a fifth determining submodule configured to determine a target bitmap obtained by mask processing as a bitmap representing the Type0 PUSCH resource allocated to the UE.

In one example, the apparatus further includes:

a first sending module configured to send, to the UE, resource indication information indicating the Type0 PUSCH resource allocated to the UE.

In one example, the first sending module includes:

a sending submodule configured to send, to the UE, RRC signaling carrying a bitmap corresponding to the Type0 PUSCH resource allocated to the UE.

In one example, the resource set is determined based on indication information reported by the at least one UE for indicating the capability of the UE.

In one example, the Type0 PUSCH resource belongs to a Type0 PUSCH resource complete set, where the Type0 PUSCH resource complete set is specified by a communication protocol, and/or, pre-agreed.

According to a fourth aspect of an example of the disclosure, a resource configuration apparatus is provided and applied to user equipment (UE). The apparatus includes: a second receiving module, where the second receiving module is configured to receive resource indication information of a Type0 PUSCH resource allocated to a physical uplink shared channel (PUSCH) of the UE and sent by a base station, where the Type0 PUSCH resource is determined by the base station from a resource set, the resource set includes the at least one Type PUSCH resource, and a difference between a maximum value of a peak-to-average power ratio (PAPR) corresponding to each Type0 PUSCH resource and a minimum value of the PAPR in the resource set does not exceed a first difference range.

In one example, the Type0 PUSCH resource is represented by a bitmap.

In one example, the second receiving module includes:

a second receiving submodule configured to receive RRC signaling carrying a bitmap corresponding to the Type0 PUSCH resource allocated to the UE.

In one example, the apparatus further includes at least one of the following:

a second sending module configured to send capability indication information indicating the capability of the UE to the base station, where the capability indication information is configured to indicate a second difference range between the maximum value of the PAPR of the Type0 PUSCH resource allowed by the UE and the minimum value of the PAPR of the Type0 PUSCH resource allowed by the UE and/or a type of the UE; and a third sending module configured to send a bitmask to the base station, where the bitmask is associated with the second difference range and/or a bitmask associated with the type of the UE.

In one example, the Type0 PUSCH resource belongs to a Type0 PUSCH resource complete set, where the Type0 PUSCH resource complete set is specified by a communication protocol, and/or, pre-agreed.

According to a fifth aspect of an example of the disclosure, a communication device is provided, including a processor, a memory, and an executable program stored on the memory and capable of being run by the processor, where the processor, when running the executable program, executes steps of the resource configuration method as described in the first aspect or the second aspect.

According to a sixth aspect of an example of the disclosure, a non-transitory storage medium is provided, storing an executable program, where the executable program, when being executed by a processor, implements steps of the resource configuration method as described in the first aspect or the second aspect.

According to the resource configuration method and apparatus, the communication device and the storage medium provided by the examples of the disclosure, the base station configures the resource set of the physical uplink shared channel (PUSCH), the resource set includes the at least one Type0 PUSCH resource, and the difference between the maximum value of a peak-to-average power ratio (PAPR) corresponding to each Type0 PUSCH resource and the minimum value of the PAPR in the configured resource set does not exceed the first difference range. In this way, the difference between the maximum value in the PAPR of the Type0 PUSCH resource in the resource set and the minimum value in the PAPR of the Type0 PUSCH resource in the resource set is limited to limit the Type0 PUSCH resource that the base station can configure, so that the UE merely needs to design within a certain PAPR range, to reduce a complexity degree of UE design, and then reduce the UE cost.

What is claimed is:

1. A method for resource configuration, performed by a base station, and comprising:

configuring a resource set of a physical uplink shared channel (PUSCH) for a user equipment (UE), wherein the resource set comprises at least one Type0 PUSCH resource, wherein a maximum value of a peak-to-average power ratio (PAPR) corresponding to each Type0 PUSCH resource and a minimum value of the PAPR are configured by the base station for each Type0 PUSCH resource in the resource set, such that a difference between the maximum value and the minimum value does not exceed a first difference range; and determining Type0 PUSCH resource allocated to the UE from the resource set.

2. The method according to claim 1, wherein the Type0 PUSCH resource is represented by a bitmap.

3. The method according to claim 1, further comprising:

receiving capability indication information reported by the UE; and determining, based on the capability indication information, at least one of a second difference range between a maximum value of a PAPR of Type0 PUSCH resource allowed by the UE and a minimum value of the PAPR of the Type0 PUSCH resource allowed by the UE, or a type of the UE.

4. The method according to claim 3, wherein determining the Type0 PUSCH resource allocated to the UE from the resource set comprises:

determining at least one of a bitmask associated with the second difference range or a bitmask associated with the type of the UE;

performing mask processing on a bitmap corresponding to Type0 PUSCH resource selected from the resource set and associated with the UE with the bitmask; and determining a target bitmap obtained by the mask processing as a bitmap representing the Type0 PUSCH resource allocated to the UE.

5. The method according to claim 3, wherein determining the Type0 PUSCH resource allocated to the UE from the resource set comprises:

determining a resource subset associated with the type of the UE in the resource set based on at least one of the second difference range or a bitmask associated with the type of the UE, wherein a resource subset corresponding to a capability of the UE comprises the at least one Type0 PUSCH resource; and determining the Type0 PUSCH resource allocated to the UE from the resource subset.

6. The method according to claim 1, wherein determining the Type0 PUSCH resource allocated to the UE from the resource set comprises:

receiving a bitmask reported by the UE;

performing mask processing on a bitmap corresponding to Type0 PUSCH resource selected from the resource set and associated with the UE with the bitmask; and determining a target bitmap obtained by the mask processing as a bitmap representing the Type0 PUSCH resource allocated to the UE.

7. The method according to claim 1, further comprising:

sending, to the UE, resource indication information indicating the Type0 PUSCH resource allocated to the UE.

8. The method according to claim 7, wherein sending, to the UE, the resource indication information indicating the Type0 PUSCH resource allocated to the UE comprises:

sending, to the UE, radio resource control (RRC) signaling carrying a bitmap corresponding to the Type0 PUSCH resource allocated to the UE.

9. The method according to claim 1, wherein the resource set is determined based on indication information reported by at least one user equipment (UE) for indicating a capability of the at least one UE.

10. The method according to claim 1, wherein the Type0 PUSCH resource belongs to a Type0 PUSCH resource complete set, wherein the Type0 PUSCH resource complete set is at least one of: specified by a communication protocol, or pre-agreed.

11. A non-transitory storage medium, storing an executable program, wherein the executable program, when executed by a processor of the base station, causes the base station to perform the method according to claim 1.

12. A method for resource configuration, performed by a user equipment (UE), and comprising:

receiving resource indication information of a Type0 PUSCH resource allocated to a physical uplink shared channel (PUSCH) for the UE and sent by a base station, wherein the Type0 PUSCH resource is determined by the base station from a resource set, the resource set comprises at least one Type0 PUSCH resource, wherein a maximum value of a peak-to-average power ratio (PAPR) corresponding to each Type0 PUSCH resource and a minimum value of the PAPR are configured by the base station for each Type0 PUSCH resource in the resource set, such that a difference between the maximum value and the minimum value does not exceed a first difference range.

13. The method according to claim 12, wherein the Type0 PUSCH resource is represented by a bitmap.

14. The method according to claim 13, wherein receiving the resource indication information of the Type0 PUSCH resource allocated to the PUSCH of the UE and sent by the base station comprises:

receiving radio resource control (RRC) signaling carrying a bitmap corresponding to the Type0 PUSCH resource allocated to the UE.

15. The method according to claim 12, further comprising at least one of:

sending capability indication information indicating a capability of the UE to the base station, wherein the capability indication information is configured to indicate at least one of a second difference range between a maximum value of a PAPR of Type0 PUSCH resource allowed by the UE and a minimum value of the PAPR of the Type0 PUSCH resource allowed by the UE, or a type of the UE; or sending a bitmask to the base station, wherein the bitmask is associated with at least one of the second difference range or the type of the UE.

16. The method according to claim 12, wherein the Type0 PUSCH resource belongs to a Type0 PUSCH resource complete set, wherein the Type0 PUSCH resource complete set is at least one of: specified by a communication protocol, or pre-agreed.

17. A communication device, comprising:

a memory that stores an executable program;

one or more processors that are communicatively coupled to the memory;

wherein the executable program, when collectively executed by the one or more processors, causes the communication device to act as the UE and perform method according to claim 12.

18. A non-transitory storage medium, storing an executable program, wherein the executable program, when executed by a processor of the UE, causes the UE to perform the method according to claim 12.

19. A communication device, comprising:

a memory that stores an executable program;

one or more processors that are communicatively coupled to the memory;

wherein the executable program, when collectively executed by the one or more processors, causes the communication device to:

configure a resource set of a physical uplink shared channel (PUSCH) for a user equipment (UE), wherein the resource set comprises at least one Type0 PUSCH resource, wherein a maximum value of a peak-to-average power ratio (PAPR) corresponding to each Type0 PUSCH resource and a minimum value of the PAPR are configured by the communication device for each Type0 PUSCH resource in the resource set, such that a difference between the maximum value and the minimum value does not exceed a first difference range; and determine Type0 PUSCH resource allocated to the UE from the resource set.

* * * * *